Patented Nov. 25, 1952

2,619,446

UNITED STATES PATENT OFFICE 2,619,446

PRODUCT OF REACTING AN ARYL MERCURIC SALT, A LOWER ALIPHATIC AMINE AND EITHER FORMAMIDE OR ACETAMIDE AND DISINFECTANT COMPOSITIONS COMPRISING THE SAME

Carl N. Andersen, Briarcliff Manor, N. Y.

No Drawing. Application November 23, 1949, Serial No. 129,200

12 Claims. (Cl. 167—30)

The invention relates to a process for the preparation of aromatic mercury compositions and to the products obtained thereby. More particularly, it pertains to the production of water-soluble phenyl mercuric compositions and includes correlated improvements and discoveries whereby the properties of such compositions are enhanced and the utilization thereof facilitated.

An object of the invention is the provision of a process in accordance with which an organo-mercury composition is prepared by combining an aromatic, or aryl, mercuric compound with an amine, suitably a diamine, with the obtention of a soluble aromatic mercuric composition.

A further object of the invention is the provision of a process for the preparation of soluble aromatic mercuric compositions wherein an aromatic mercuric compound is combined with an aliphatic diamine and an acid amide.

Another object of the invention is to provide a procedure in which a phenyl mercuric compound is solubilized through a combination with an aliphtic diamine and an acid amide.

An additional object of the invention is the provision of a process whereby soluble phenyl mercuric compositions are obtained by combining a phenyl mercuric compound with an aliphatic diamine, an acid amide, a humectant, a surface active agent and a suitable inorganic compound.

A still further object of the invention is the provision of a process for the preparation of soluble aromatic mercuric compounds which may be readily, effectively and economically carried out to any desired extent.

A more particular object of the invention is to provide a process in which soluble aromatic mercuric compositions are produced through a combination of phenyl mercuric acetate, ethylene diamine and formamide.

An especial object of the invention is to provide soluble aromatic mercuric compositions having the general formula: $(RHg)_x R_1$, in which R represents an aromatic or aryl grouping in which mercury is directly attached to a carbon atom, $R_1$ is the residue of a product resulting from reaction between an amine, as a diamine, and an acid amide, which residue is linked directly to the RHg group, and $x$ is a whole number, usually 1.

A specific object of the invention is to provide a soluble aromatic mercuric composition having the general formula: $RHgR_1$, in which R is a phenyl group and $R_1$ is the residue of the product resulting from reaction between ethylene diamine and foramide, and which composition may contain also a humectant, a surface active agent and a suitable inorganic compound.

Other objects of the invention will in part be obvious and will in part appear hereinafter.

The invention accordingly comprises the several steps, and the relation of one or more of such steps with respect to each of the others, and the product possessing the features and properties which are exemplified in the following detailed disclosure, and the scope of the invention will be indicated in the claims.

In the practice of the invention, soluble aromatic mercury compositions may be produced by combining an aromatic mercuric compound in which mercury is linked directly to an aromatic or aryl group containing carbon atoms linked only with a member of the group consisting of hydrogen, carbon and mercury, with an amine, preferably a diamine, and an acid amide. Suitable amines are the lower aliphatic amines containing from 2 to 4 carbon atoms and, specifically, ethyl, isopropyl and tri-isopropyl amine, and the diamines, ethylene, 1,2-propane, 1,3-propane and 1,4-butane.

The aromatic mercuric compounds which may be produced correspond to the general formula $(RHg)_x R_1$, in which R represents an aromatic or aryl group in which the mercury is directly linked or attached to a carbon atom, $R_1$ represents the residue of a product resulting from reaction between an amine, as a diamine, and an acid amide such as formamide, acetamide and the like, which residue is linked directly to the RHg group or groups, and $x$ is a small whole number, usually 1, but may be greater than 1 in the event that more than one of the hydrogen atoms of the amine is replaced or substituted.

Further, the aryl or aromatic grouping represented by R may be an aromatic or aryl nucleus with or without side chains and of the type in which the carbon atoms of the nucleus and side chain are linked or bonded directly only with a member of the group consisting of hydrogen, carbon and mercury. Specifically, R may be a phenyl group ($C_6H_5$), or an aromatic hydrocarbon radical or group similar to the phenyl group, such as a polycyclic group, e. g., naphthyl, anthranyl and phenanthranyl, in which all of the carbon atoms of the nucleus other than that combined with the mercury, and also the carbon atoms of the side chain have their valences satisfied either by carbon or by hydrogen. Such groupings, more especially, are diphenyl, tolyl, xylyl, naphthyl, anthranyl and phenanthranyl, and as side chains mention may be made of the ethyl, propyl, butyl, amyl and dodecyl radicals or groups.

Moreover, as above indicated, $R_1$ represents the residue of the product which may be in the nature of a complex addition product resulting, from the interaction of the amine and the acid amide, specifically ethylene diamine and formamide, at least one of the hydrogen atoms reacting and the residue attaching itself to the mercury atom through replacement of the negative group or radical. Furthermore, this residue may be varied and it may contain either carbocylic or heterocyclic groupings of which the number may vary.

As aromatic mercuric compounds employed mention may be made of phenyl mercuric acetate, phenyl mercuric hydroxide, phenyl mercuric lactate, phenyl mercuric nitrate, phenyl mercuric chloride and the corresponding tolyl, napththyl and phenanthranyl compounds. The humectant suitably is a polyhydric alcohol such as the glycols, ethylene, propylene, butylene and their lower polymers, and the higher alcohols, glycerol, erythrol, sorbitol, mannitol, dulcitol and dextrine. The surface active agent may be a partial fatty acid ester of a polyhydric alcohol, especially the higher fatty acids as lauric, myristic, stearic, palmitic and oleic acids esterified with, for example, glycerol, the sugar alcohols as sorbitol, mannitol and dulcitol, and the inner anhydrides and ethers thereof; a salt of a sulfated higher alcohol as the sodium and potassium salts of lauryl sulfate and myristyl sulfate, and an alkyl aryl polyglycol ethylene ether, e. g., an alkyl phenyl polyethylene glycol ether in which the alkyl may be heptyl, octyl and nonyl and specifically octyl phenyl polyethylene glycol ether, which may be prepared by reaction between octyl phenol and eleven ethylene oxide molecules.

The aromatic mercuric compositions obtained are soluble in various media, as water and organic solvents of which mention may more especially be made of lower aliphatic alcohols, esters, ethers and ketones.

It may be desired to have the mercuric compositions in the form of a dry powder and such may be obtained by utilizing, in addition to the preceding, an inorganic compound selected from the group consisting of alkali metal salts of a tetraborate, a polyphosphate, such as a tripolyphosphate and a polymetaphosphate, and a tetrapyrophosphate, specifically, borax, sodium tripolyphosphate, sodium hexametaphosphate, hexa-sodium tetrametahosphate, and tetra sodium pyrophosphate. The dry composition may be prepared in such a manner as to yield a solid mass which may be uniformly mixed and granulated so as to pass through a screen of suitable mesh, as an 8-mesh screen, or it may be produced as a suspension or slurry which may be spray dried.

In a general manner the preparation of the soluble aromatic mercuric compounds may be obtained by combining an aromatic mercuric radical or group as above-defined with a compound resulting from the reaction between an acid amide and an amine and which contains at least one free hydrogen atom. The combination or reaction may be effected by employing a common solvent or through utilization of separate solvents which are of compatible nature. The compositions obtained are either solutions per se or are readily soluble in water and other solvents. As above indicated, a solid or dry product is produced when an inorganic compound, as borax, is employed either in sufficient amount to give a solid which may be dry granulated or as a suspension which may be spray dried.

It will be understood that the substances referred to hereinabove may be used either individually or in compatible combinations, or admixtures.

As an illustrative embodiment of a manner in which the invention may be practiced, the following examples are presented.

Example 1

910 grams of phenyl mercuric acetate are placed in a suitable receptacle and 250 grams of ethylene diamine added thereto and well mixed therewith. There are then added 700 grams of acetamide, 1050 grams of propylene glycol and 100 grams of water. The greater part of the solid will dissolve without heat and with slight heating complete solution will be obtained. If necessary, the reaction mass may be filtered and then allowed to stand. A clear solution is thus obtained and no separation of solid results upon cooling.

Example 2

100 grams of phenyl mercuric chloride are placed in a suitable vessel along with 50 grams of ethylene diamine. The reaction mass is then heated, whereupon the greater part of the phenyl mercuric chloride will pass in solution. There are then added 500 grams of formamide and 450 grams of water, and a complete solution results when the mass is gently heated. Should there be any insoluble material due to impurities, this should be removed by filtering.

Example 3

The procedure of Example 2 may be followed with the substitution of 50 grams of either ethylamine or isopropylamine or tri-isopropylamine for the ethylene diamine.

Example 4

Into a suitable container there may be placed 50 grams of phenyl mercuric acetate, to which there are added 18.75 grams of ethylene diamine. The mass is then heated and thereto are added 350 grams of formamide, 18.75 grams of propylene glycol, 10 grams of octyl phenyl polyethylene glycol ether and 52.5 grams of water. A clear solution is obtained which remains so after standing.

Example 5

The procedure of Example 4 may be followed with utilization of 80 grams of phenyl mercuric chloride, 20 grams of ethylene diamine, 20 grams of octyl phenyl polyethylene glycol ether, 280 grams of formamide and 20 grams of water.

Example 6

The procedure of Example 4 may be followed with the reaction mass being formed with 80 grams of phenyl mercuric acetate, 20 grams of ethylene diamine, 180 grams of formamide and 120 grams of water.

Example 7

60 grams of phenyl mercuric acetate are placed in a suitable vessel and to this are added 250 grams of formamide and 15 grams of ethylene diamine. A stable solution is thus obtained and there is no separation or precipitation upon standing.

Example 8

A super-saturated solution may be obtained by combining in a suitable container 50 grams of phenyl mercuric acetate, 40 grams of formamide and 10 grams of ethylene diamine. A completely soluble reaction product is thus produced, but if permitted to stand for a long period of time there is a slow separation of crystals.

Example 9

A solid product may be produced by preparing a reaction mix containing 50 grams of phenyl mercuric acetate, 70 grams of phenyl mercuric chloride, 100 grams of propylene glycol, 50 grams of octyl phenyl polyethylene glycol ether and 25 grams of ethylene diamine. The reaction mass is heated, whereupon complete solution results. There are then added 300 grams of borax, preferably spray dried, which is mixed until uniform and then there are added 405 grams of tetra sodium pyrophosphate. The mass thus obtained is mixed until uniform and screened through an 8-mesh sieve three times. The resulting composition dries to a hard solid in a few minutes.

Example 10

A dry material may be obtained by combining suitably 50 lbs. of phenyl mercuric acetate, 10 lbs. of octyl phenyl polyethylene glycol ether, 25 lbs. of ethylene diamine, 50 lbs. of formamide, 165 lbs. of sodium tripolyphosphate and 200 lbs. of tetra sodium pyrophosphate.

Example 11

A dry composition may also be produced by suitably combining 50 grams of phenyl mercuric acetate, 10 grams of sodium lauryl sulfate, 25 grams of ethylene diamine, 25 grams of formamide and 390 grams of tetra sodium pyrophosphate.

Example 12

15 lbs. of phenyl mercuric chloride and 12 lbs. of phenyl mercuric acetate may be dissolved in 5 lbs. of ethylene diamine and 80 lbs. of formamide. Following filtering, there may be added to the solution 174 lbs. of borax, 2 lbs. of octyl phenyl polyethylene glycol ether and 2 lbs. of dextrine. There are now added 3 gallons of water and the reaction mixture is stirred until a uniform suspension or slurry results. This suspension or slurry is spray dried at a temperature of about 375° F. with the obtention of a clear white powder which is readily soluble in water, without turbidity or cloudiness. The solubility in water at room temperature is found to be in the ratio of 1:10.

The aromatic mercuric compositions produced in accordance with the foregoing examples may be employed in either solutions or in powders having a certain desired aromatic mercury, as phenyl mercury, content. This content may be 2, 5, 10 and 20%. It will be realized, however, that both lower and higher percentages may be employed depending upon the use that is to be made of the mercuric composition.

Moreover, any suitable solvent with which the compounds entering into the preparation are soluble or miscible may be employed. Thus, if the various compounds are soluble in water the combination may be carried out therein, but other solvents as alcohols, esters and ketones may be used. Furthermore, the reaction may take place at room temperature or at an elevated temperature, for example, 80° C. This latter temperature was found to give satisfactory results with the production of a stable product.

The aromatic mercuric compositions produced in accordance with the invention are characterized by having a markedly high antiseptic and germicidal action, together with relatively low toxicity. When applied to plants and foliage there is very little, if any, resulting damage. The compositions, consequently, may be used advantageously in agriculture for the treatment of blight and various forms of infection resulting from the growth of bacteria and fungi. Additionally, the compositions are well adapted for the treatment of paper slimes, lumber, textiles, certain types of rubber, and also for general disinfection purposes.

Since certain changes in carrying out the above process, and certain modifications in the product which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process for preparing soluble aromatic mercury compositions, which comprises reacting an aromatic mercuric compound belonging to the group consisting of phenyl mercuric acetate, hydroxide, lactate, nitrate and chloride and the corresponding diphenyl, tolyl, xylyl, naphthyl, anthranyl and phenanthranyl compounds in which the aromatic group contains carbon atoms linked only with a member of the group consisting of hydrogen, carbon and mercury, with a lower aliphatic amine containing from two to four carbon atoms and an acid amide selected from the group consisting of formamide and acetamide.

2. A process for preparing soluble aromatic mercury compositions, which comprises reacting an aromatic mercuric compound belonging to the group consisting of phenyl mercuric acetate, hydroxide, lactate, nitrate and chloride and the corresponding diphenyl, tolyl, xylyl, naphthyl, anthranyl and phenanthranyl compounds in which the aromatic group contains carbon atoms linked only with a member of the group consisting of hydrogen, carbon and mercury, with a diamine selected from the group consisting of ethylene, 1,2-propane, 1,3-propane and 1,4-butane diamine and an acid amide selected from the group consisting of formamide and acetamide.

3. A process for preparing soluble aromatic mercury compositions, which comprises reacting a phenyl mercuric compound belonging to the group consisting of phenyl mercuric acetate, hydroxide, lactate, nitrate and chloride with a diamine selected from the group consisting of ethylene, 1,2-propane, 1,3-propane and 1,4-butane diamine and an acid amide selected from the group consisting of formamide and acetamide.

4. A process for preparing soluble aromatic mercury compositions, which comprises reacting a phenyl mercuric compound belonging to the group consisting of phenyl mercuric acetate, hydroxide, lactate, nitrate and chloride with ethylene diamine and an acid amide selected from the group consisting of formamide and acetamide.

5. A process for preparing soluble aromatic mercury compositions, which comprises reacting an aromatic mercuric compound belonging to the group consisting of phenyl mercuric acetate, hydroxide, lactate, nitrate and chloride and the corresponding diphenyl, tolyl, xylyl, naphthyl, anthranyl and phenanthranyl compounds in which the aromatic group contains carbon atoms linked only with a member of the group consisting of hydrogen, carbon and mercury with a diamine selected from the group consisting of ethylene, 1,2-propane, 1,3-propane and 1,4-butane diamine and an acid amide selected from the group consisting of formamide and acetamide, and admixing therewith a humectant and a surface active agent.

6. A process for preparing soluble aromatic mercury compositions, which comprises reacting phenyl mercury acetate with ethylene diamine and formamide.

7. A process for preparing soluble aromatic mercury compositions, which comprises reacting a phenyl mercuric compound selected from the group consisting of phenyl mercuric acetate, hydroxide, lactate, nitrate and chloride with ethylene diamine and formamide, and admixing therewith a polyhydric alcohol and an alkyl aryl polyethylene glycol ether.

8. A process for preparing soluble aromatic mercury compositions, which comprises reacting a phenyl mercuric compound selected from the group consisting of phenyl mercuric acetate, hydroxide, lactate, nitrate and chloride with ethylene diamine and formamide, and admixing therewith propylene glycol, octyl phenyl polyethylene glycol ether and borax.

9. A composition of matter having the general formula: $(RHg)_x R_1$, in which R represents an aromatic grouping to which the mercury is directly linked through a carbon atom and which grouping contains carbon atoms that are linked only with a member of the group consisting of hydrogen, carbon and mercury, $R_1$ represents the residue of a product resulting from interaction between a lower aliphatic amine containing from two to four carbon atoms and an acid amide selected from the group consisting of formamide and acetamide, and $x$ is a small whole number, said composition being soluble in water to form clear solutions and in organic solvents selected from the group consisting of lower aliphatic alcohols, esters, ethers and ketones.

10. A composition of matter having the general formula: $(RHg)_x R_1$, in which R represents a phenyl group to which the mercury is directly linked through a carbon atom and which group contains carbon atoms that are linked only with a member of the group consisting of hydrogen, carbon and mercury, $R_1$ represents the residue of a product resulting from interaction between a diamine selected from the group consisting of ethylene, 1,2-propane, 1,3-propane and 1,4-butane diamine and an acid amide selected from the group consisting of formamide and acetamide, and $x$ is a small whole number, said composition being soluble in water to form clear solutions and in organic solvents selected from the group consisting of lower aliphatic alcohols, esters, ethers and ketones.

11. A composition of matter having the general formula: $RHgR_1$, in which R represents a phenyl group to which the mercury is directly linked through a carbon atom and which group contains carbon atoms that are linked only with a member of the group consisting of hydrogen, carbon and mercury and $R_1$ represents the residue of the product resulting from reaction between ethylene diamine and formamide, said composition being soluble in water to form clear solutions and in organic solvents selected from the group consisting of lower aliphatic alcohols, esters, ethers and ketones.

12. A composition of matter consisting essentially of a compound having the general formula: $RHgR_1$, in which R represents a phenyl group to which the mercury is directly linked through a carbon atom and which group contains carbon atoms that are linked only with a member of the group consisting of hydrogen, carbon and mercury and $R_1$ represents the residue of the product resulting from reaction between ethylene diamine and formamide; in admixture with a polyhydric alcohol, a surface active agent and an alkali metal salt of a tetraborate, said composition of matter being soluble in water to form clear solutions.

CARL N. ANDERSEN.

REFERENCES CITED

The following references are of record in the file of this patent:

UNITED STATES PATENTS

| Number | Name | Date |
|---|---|---|
| 1,326,367 | Nieuwland | Dec. 30, 1919 |
| 2,118,133 | Andersen | May 24, 1938 |
| 2,241,829 | Six et al. | May 13, 1941 |
| 2,411,815 | Sowa | Nov. 26, 1946 |
| 2,423,262 | Sowa | July 1, 1947 |